United States Patent
Haslem et al.

(10) Patent No.: US 7,604,710 B2
(45) Date of Patent: Oct. 20, 2009

(54) MODULAR FLOATING WATER EVAPORATION SYSTEM

(75) Inventors: David J Haslem, Vernal, UT (US);
Michael E. Dofelmire, Vernal, UT (US);
Darrin N. Haslem, Yorktown, VA (US);
Michael T. Lawing, Yorktown, VA (US)

(73) Assignee: EvapoRite Systems, Inc., Yorktown, VA (US)

( * ) Notice: Subject to any disclaimer, the term of this patent is extended or adjusted under 35 U.S.C. 154(b) by 610 days.

(21) Appl. No.: 11/277,985

(22) Filed: Mar. 30, 2006

(65) Prior Publication Data
US 2007/0227674 A1 Oct. 4, 2007

(51) Int. Cl.
*B01D 1/20* (2006.01)
*B01D 29/00* (2006.01)
*C02F 1/12* (2006.01)
*E02B 15/04* (2006.01)

(52) U.S. Cl. ............... 159/3; 159/47.3; 159/DIG. 40; 202/200; 210/242.1; 210/258; 210/435; 239/725; 239/DIG. 19; 405/129.2; 405/224.1

(58) Field of Classification Search ............ 159/3, 159/47.3, DIG. 40, DIG. 41; 202/200; 203/10, 203/90; 210/242.1, 258, 435; 239/725, 726, 239/DIG. 19; 405/129.2, 224.1
See application file for complete search history.

(56) References Cited

U.S. PATENT DOCUMENTS

| | | | |
|---|---|---|---|
| 1,233,119 A | 7/1917 | Parker | |
| 3,622,074 A * | 11/1971 | Frohwerk | ................. 239/11 |
| 4,206,877 A | 6/1980 | Hoza, III | |
| 4,267,130 A * | 5/1981 | Curtis | ................. 261/112.1 |
| 4,449,849 A | 5/1984 | Horn et al. | |
| 4,504,362 A * | 3/1985 | Kruse | ................. 203/3 |
| 4,713,172 A | 12/1987 | Horn et al. | |
| 4,762,276 A | 8/1988 | Foust | |
| 5,330,017 A | 7/1994 | Hart et al. | |
| 6,637,379 B2 | 10/2003 | Hays et al. | |
| 7,448,600 B1 * | 11/2008 | Boulter | ................. 261/28 |
| 2008/0283623 A1 * | 11/2008 | Haslem et al. | ................. 239/1 |

* cited by examiner

*Primary Examiner*—Virginia Manoharan
(74) *Attorney, Agent, or Firm*—Clausen Miller PC

(57) ABSTRACT

A floating water evaporation system for use in disposing of excess water from oil and gas drilling operations is provided. One or more nozzle arrays float on the surface of a wastewater pond a distance away from the pond shoreline. Each nozzle array includes a series of upright risers that extend above a water reservoir tank. Spray nozzles are mounted on each riser. The water reservoir tank is mounted between floating pontoons that elevate the nozzles a distance above the surface of the pond. Water from the pond is pumped through the nozzles to create a patterned spray of small evaporable droplets.

9 Claims, 4 Drawing Sheets

MODULAR FLOATING WATER EVAPORATION SYSTEM

BACKGROUND

1. Field of the Invention

This invention relates to a system and method for evaporating fluids. More particularly, this invention relates to a system for evaporating wastewater left over from oil or gas drilling, fracturing, and production operations by spraying the water through nozzles located above the surface of a pond away from the pond banks.

2. Description of the Related Art

In oil and gas drilling operations drilling fluid is used to remove the drill cuttings from the bore hole and lubricate the drill. The drilling fluid is usually a mixture of clays, chemicals, weighting material and water. The drilling fluid is pumped down the hollow drill string to the bit where it picks up the drill cuttings, then circulated back up the annular space around the drill string to a drilling mud return line. From the return line the fluid passes across a shaker or screen which catches the larger cuttings while the rest of the drilling mud flows down into a mud pit. From the mud pit the drilling fluid may be sent to a particle separator where most of the remaining solids are separated from the wastewater which is then stored in a wastewater pit.

The problem with this arrangement is that the collected wastewater eventually must be disposed of. Various evaporation systems have been devised to accomplish this task. Typically, these systems involve spraying the water into the air using high-pressure pumps to maximize the surface area in order to enhance evaporation.

These spray evaporation systems have several disadvantages. First, some cannot operate in high winds or extreme cold weather. Second, the mist still allows for ground saturation in some areas of sustained winds which requires system to shut down. Third, these systems can be cumbersome to set up, maintain and move.

Foust U.S. Pat. No. 4,762,276 describes a water evaporation system that includes a floating tank that can float in the middle of a pond, a water collector tank suspended under the floating tank, and riser pipes attached to the collector tank at an angle to carry water from the collector tank to spray nozzles. The Foust system does not have a water tank that is mounted between a pair of floating tanks and risers extending vertically upward from the water tank so that the spray nozzles located at the riser ends are located as far as possible from the pond shore.

Thus there is a need for an improved spray evaporation system useful in oil and gas drilling operations that is easy to set up and tear down, is capable of operating in windy or sub-zero temperatures, and minimizes ground saturation.

Another object of the invention is to maximize the dispersal of large volumes of water by providing water droplets having the maximum available surface area.

Yet another object of the invention is to provide a wastewater remediation system that minimizes impact on the environment, particularly from ground saturation by wastewater.

Further and additional objects will appear from the description, accompanying drawings, and appended claims.

SUMMARY OF THE INVENTION

The invention is a water evaporation system for use in disposing of excess water left over from oil or gas drilling, fracturing, and production operations and from other operations. The system comprises one or more nozzle arrays that float on the surface of a wastewater pond a distance away from the pond periphery or shoreline. Each nozzle array comprises a water reservoir for holding the wastewater before it is evaporated, two or more arm structures connected to and extending above the water reservoir, and spray nozzles mounted on each arm for creating a fine evaporable mist. The water reservoir is mounted to floating pontoons in order to elevate the nozzles a distance above the surface of the pond.

A high volume/high pressure pump is used to pump the wastewater from the pond through a series of in-line brush away filters before the water is sent to each of the water reservoirs. Water from each reservoir flows up through the arms and exits the spray nozzles mounted on the arms. The wastewater flow rate from the pump is controlled by regulating the nozzle capacities, engine RPM, and pump suction capacity. The nozzles convert the water into a patterned spray of droplets, preferably having an average diameter of about 300 microns (500 microns for high debris ponds), small enough to cause significant evaporation of the water for disposal purposes. The spray pattern for each nozzle can be set from a 60 degree "cone" to a 180 degree "cone".

The system maximizes dispersal of large volumes of water to generate the maximum available surface area of the water droplets. The system throws up to 980% more water per minute into the air than conventional water evaporation systems, thereby allowing the system to evaporate 10 to 30 times more water per day than previously achieved.

The system incorporates several features that minimize impact on the environment. First, the nozzle arrays are located near the center of the pond to separate the spray operation from the pond banks. Second, the nozzles atomize the water to a finer mist than previously achieved. Third, the system enables an operator to change the nozzle spray patterns to maximize evaporation. Fourth, the system allows for optional windscreens to be placed around the pond to minimize overspray.

The system is modular in the sense that the number of nozzle arrays and the number of arms per nozzle array can be changed according to the local evaporation needs.

THE DRAWINGS

DETAILED DESCRIPTION OF THE INVENTION

Figure 1:
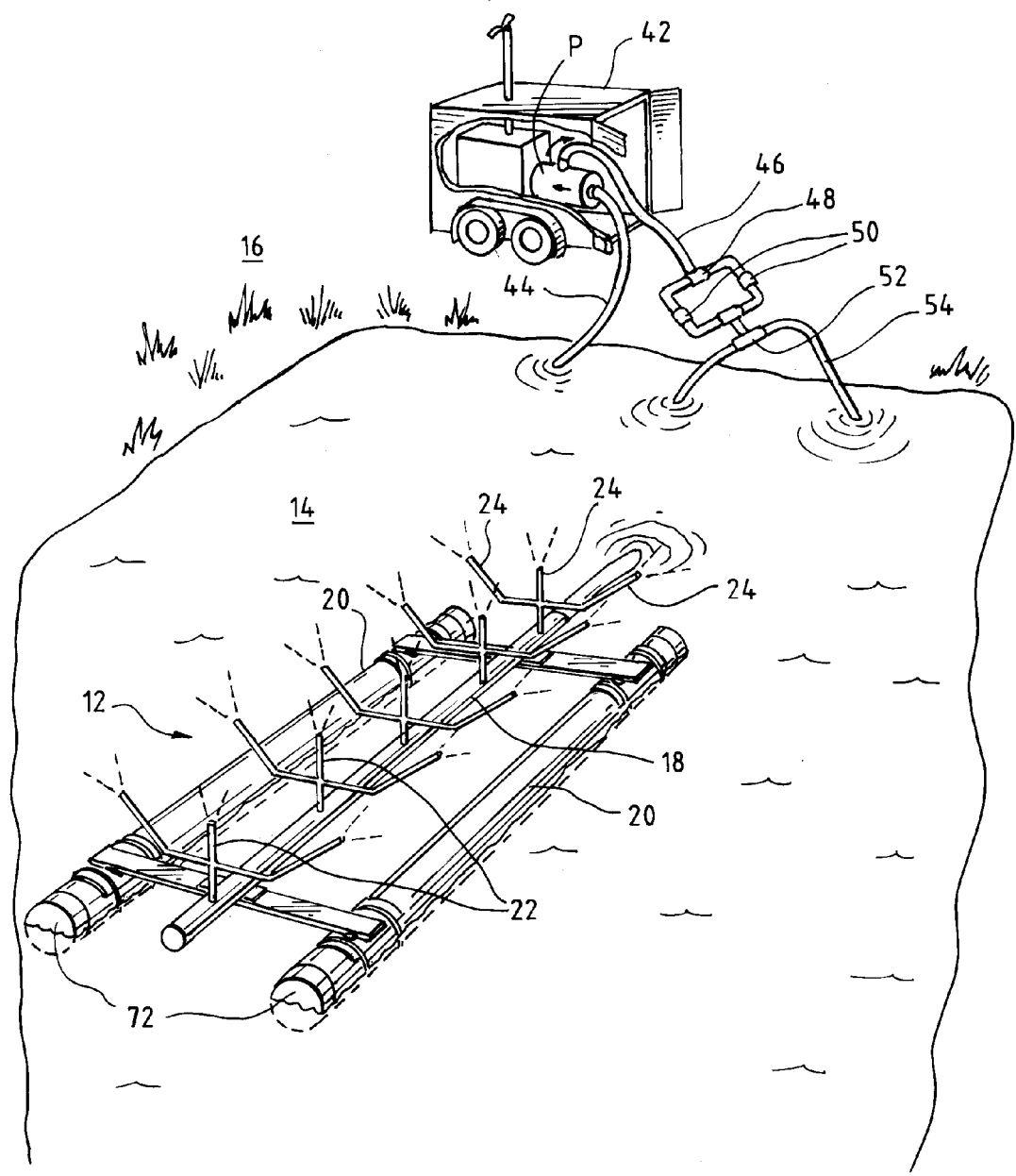
FIG. 1 is a perspective view of one embodiment of a floating water evaporation system according to the present invention.

Turning to the drawings, there is shown in FIGS. 1 one embodiment of the present invention, a floating water evaporation system for use in disposing of excess water from oil and gas drilling operations and from other applications. The system comprises one or more nozzle arrays 12 that float on the surface of a wastewater pond 14 a distance away from the pond periphery or shoreline 16. Each nozzle array 12 comprises a water reservoir 18, two or more upright "Y" shaped arm structures 22 arranged in linear fashion and connected to and extending above the water reservoir 18, and nozzles 24 mounted on each arm structure 22. The water reservoir 18 is mounted to floating pontoons 20 in order to elevate the nozzles 24 a distance above the surface of the pond 14. Water from the pond 14 is pumped through the nozzles 24, which convert the water flow into a patterned spray of evaporable droplets. The droplets preferably have an average diameter of about 300 microns (500 microns for high debris ponds) which is small enough to cause significant evaporation of the water for disposal purposes.

Figure 2:
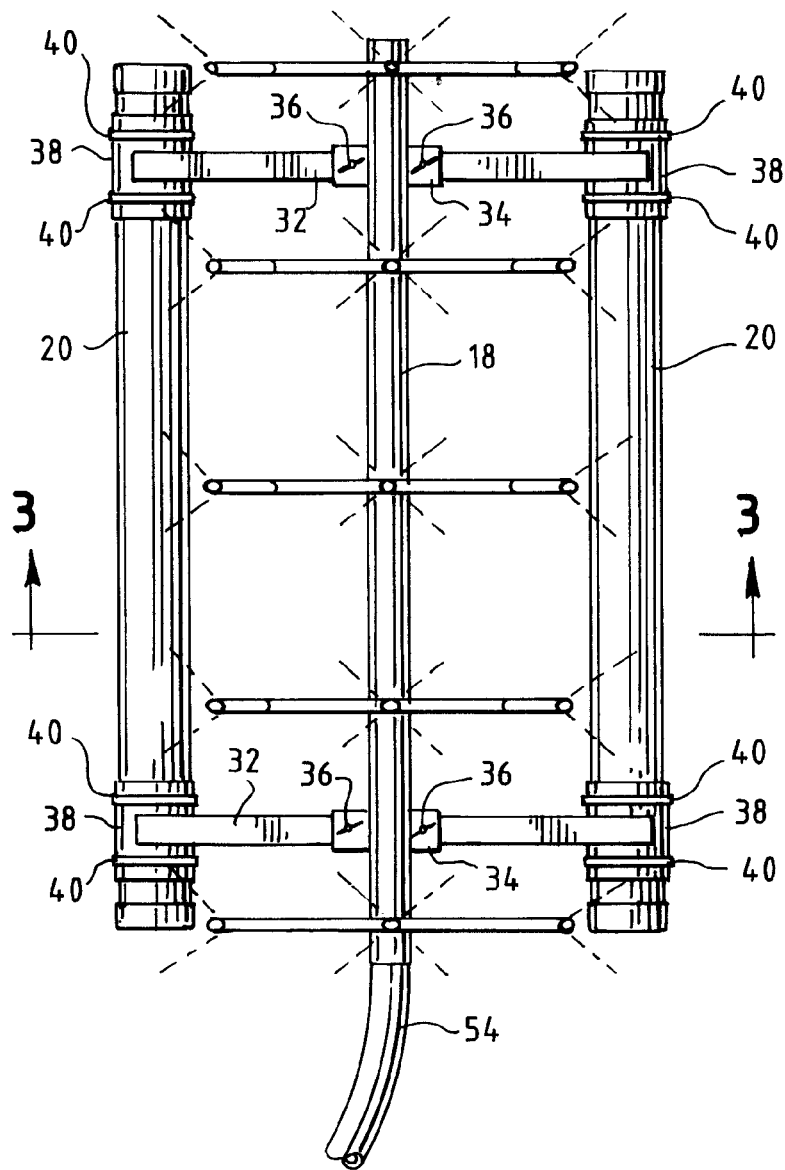
FIG. 2 is a top plan view of a nozzle array according to the present invention.
Figure 3:
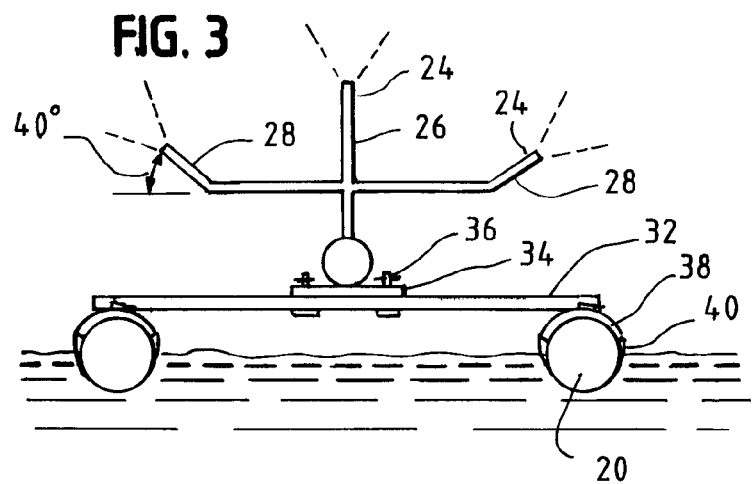
FIG. 3 is cross sectional view of the nozzle array of FIG. 2 taken along line 3-3.

FIGS. 2 and 3 provide top and side views respectively of a sample nozzle array 12. As shown in the figures, the water reservoir 18 is a long cylindrical tank, and can be made out of aluminum (for low and slightly high pH (4.0-abut 8.5) conditions), PVC plastic (for conditions outside those boundaries), or any suitable material.

Each Y-shaped arm structure 22 comprises a vertical riser 26 connected to and extending upward from the reservoir 18 and two side risers 28 that branch off of the vertical riser 26[A1], all preferably made from PVC plastic pipe. The interior of the vertical riser 26 communicates with the inside of the reservoir 18 via openings (not shown) in the top of the reservoir 18, and the interior of the side risers 28 communicate with the interior of the vertical riser 26 so that water flows from the water reservoir 18 through both the vertical and side risers 26, 28 to the nozzles 24 mounted on the distal ends of the risers 26, 28.

Five Y-shaped arms are shown in FIGS. 1 and 2. However, the number of Y-shaped arms 22 can be varied according to location and environment, thereby providing the operator with flexibility in matching pump size (see below) to the needs of customer, with fifteen arms 22 per array being a typical number.

A hollow-cone nozzle 24 is fitted to the top of each riser 26, 28. The nozzles 24 fitted to the ends of the two side risers 28 preferably spray at an angle of about 40 degrees relative to the surface of the pond. The spray pattern for each nozzle 24 can be set from a 60 degree "cone" to a 180 degree "cone". The nozzle orifice can be increased for high debris situations.

The water reservoir 18 preferably is made of aluminum but may be made of poly vinyl chloride polymer (PVC) or any other lightweight material that can withstand a water environment. Preferably the reservoir 18 has a longitudinal cylindrical shape and means for attaching the Y-shaped arms 22 to its top side. Mounting plates 34 are welded or otherwise attached to the reservoir 18 near either end to facilitate attaching the reservoir 18 to a pair of perpendicularly oriented aluminum cross braces 32. The reservoir 18 is attached to the cross braces 32 at the mounting plates 34 by clevis/cotter pins 36 that extend through openings in the mounting plates 34 and the cross braces 32, or by any other suitable means.

The water reservoir/cross brace structure is attached to two or more pontoons 20 located parallel to and on either side of the reservoir 18 by mounting saddles 38 so that the water reservoir 18 is located equidistant the pontoons 20. The arcuately shaped mounting saddles 38 may be welded directly to the underside (pond side) of the cross braces 32 near the ends of the cross braces 32 as shown in FIGS. 1-3. The pontoons 20 are held to the underside (concave side) of the mounting saddles 38 by metal retaining bands 40 or other suitable attachment means and may be capped off with caps 72.

Figure 4:
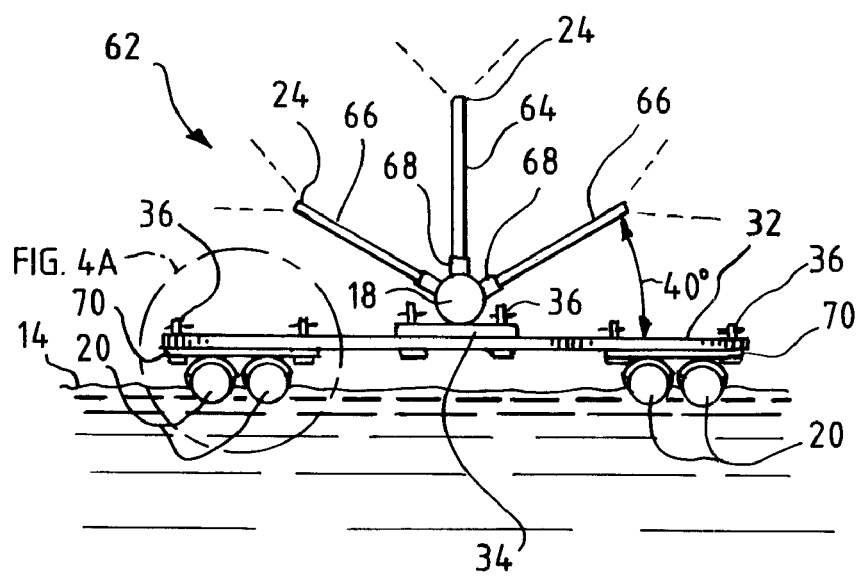
FIG. 4 is an end view of an alternative embodiment of a floating water nozzle array according to the present invention.

In an alternative embodiment of a nozzle array 62 shown in FIG. 4, three straight risers 64, 66 are directly connected to and extend upward from the water reservoir 18. The risers 64, 66 are mounted to threaded couplers 68 welded to the aluminum reservoir 18. The central riser 64 extends vertically upward while the side risers 66 extend upward at about a 40 degree angle relative to the pond surface. As in the previous embodiment, a hollow-cone nozzle 24 is fitted to the top of each riser 66, 88 and can be set to spray from a 60 degree "cone" to a 180 degree "cone". The nozzle orifice can be increased for high debris situations.

Figure 4A:
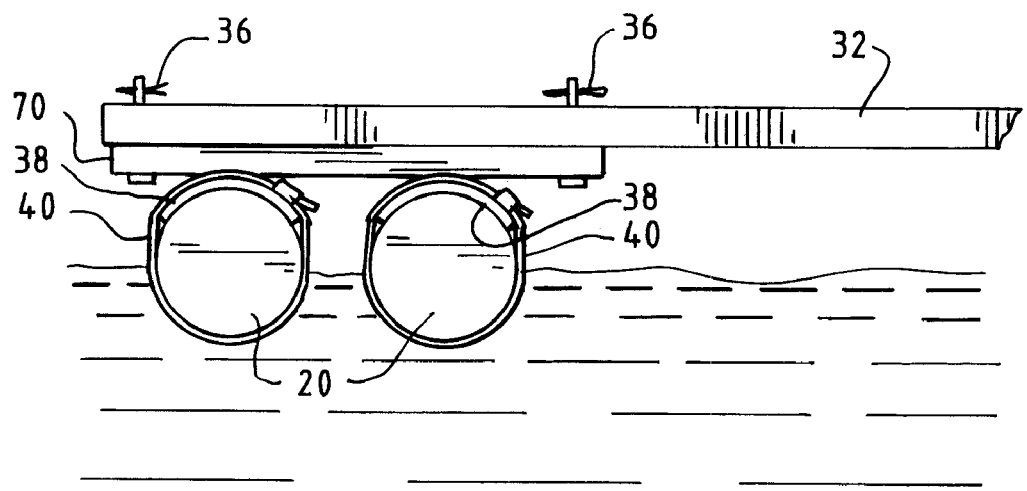
FIG. 4a is a close up end view of the mounting saddle assembly of FIG. 4.
Figure 4B:
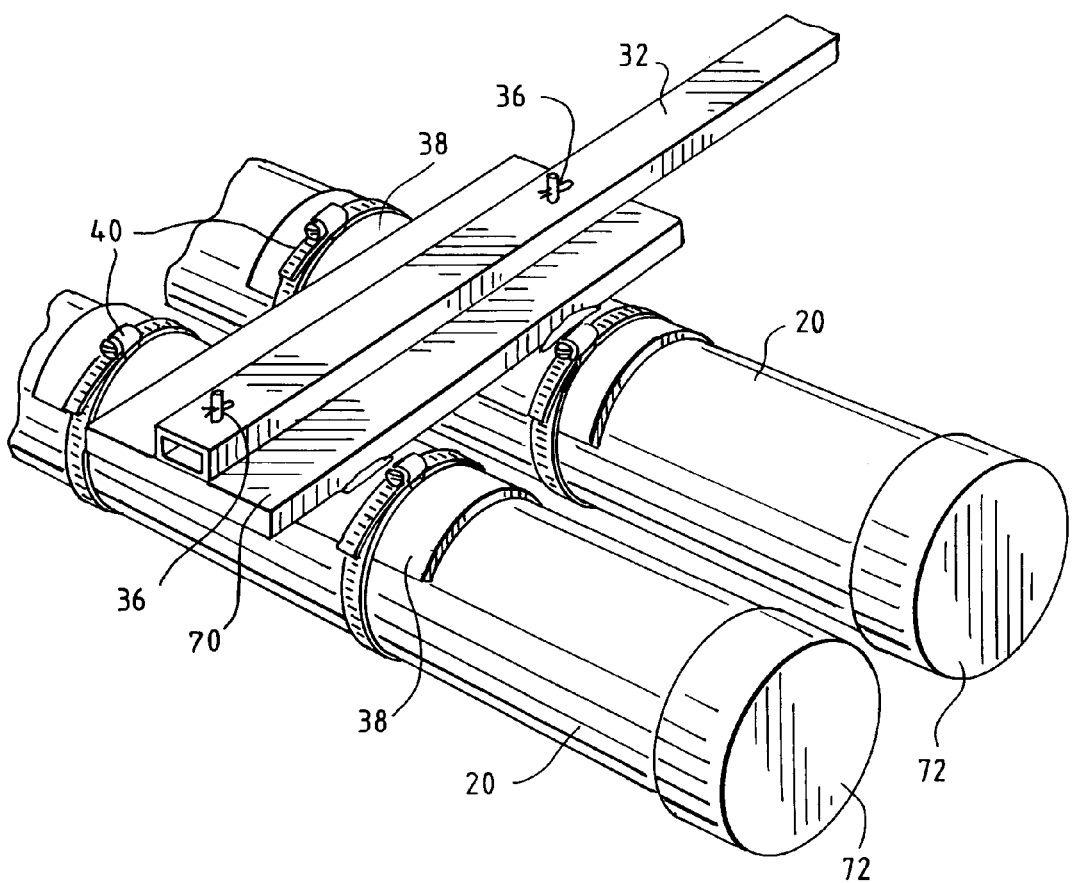
FIG. 4b is a close up side perspective view of the mounting assembly of FIG. 4.

As best shown in FIGS. 4a and 4b, multiple pontoons 20 may be used on either side of the water reservoir 18 to float the nozzle array 62 on the surface of the pond 14. Each pontoon 20 nests within the underside (concave side) of a mounting saddle 38 and is held thereto with metal retaining bands 40 as in the previous embodiment. In this embodiment the mounting saddles 38 are welded to flat mounting plates 70 that are then attached to the cross braces 32 by clevis/cotter pins 36 or other means.

The invention works in the following manner. Referring to FIG. 1, a high volume pump P (preferably mounted on a skid and slid into a trailer 42 for easy transport) is used to pump the wastewater from the pond 14 (or holding tank) through a intake hose 44 connected to the intake side of the pump. A conventional foot valve is connected to the intake hose to prevent the backflow of water. A discharge hose 46 connected to the discharge side of the pump carries the water to a first manifold 48 and then through a series of in line brush away filters 50 arranged in parallel to eliminate debris that could clog the nozzles 24. The parallel streams exiting the brush-away filters 50 flow into a second manifold 52 which then directs the wastewater stream into two or more flexible secondary or receiving hoses 54.

The high volume pump may be driven by a diesel motor. A separate diesel fuel tank that feeds diesel fuel to the diesel motor may be located in the bed of the trailer 42 or of a separate truck. Alternatively, the pump may be driven by an electric motor. A diesel powered electric generator that supplies electricity to the motor and a separate diesel fuel tank that feeds diesel fuel to the generator may both be located in the bed of the trailer 42 or of a separate truck.

Each receiving hose 54 is sized to be slightly larger than the actual volume required for the specific discharge hose 46 feeding it. For example, a four-inch discharge hose 46 might send water to a second manifold 52 feeding two three-inch receiving hoses 54. This arrangement is done purposely all down the line to ensure that the only thing limiting the flow of water are the spray nozzles 24. Thus the nozzles 24 are the main point of pressure regulation.

Each flexible receiving hose 54 leads to a nozzle array 12. Specifically, water is pumped through each receiving hose 54 and into a PVC or aluminum water reservoir 18 resting on PVC pontoons 20 floating on the surface of the pond 14 a distance away from the pond periphery or shoreline 16. Spraying the water away from the pond shoreline 16 mitigates the problem of overspray, since any overspray will settle into the pond 14 and not on the ground. Any fine mist that does reach the ground is usually so light that ground saturation is not a problem.

Water held in the reservoir 18 flows up through the PVC arms 22 and exits the spray nozzles 24 mounted on the vertical member 26 and side members 28 of each arm 22. As previously mentioned, the wastewater flow rate from the pump is controlled by regulating the nozzle capacities. The nozzles 24 themselves preferably are spiral cut hollow cone nozzles 24 rated at six gallons per minute at 40 PSI (although other capacities may be used. The spray pattern exiting each nozzle can be adjusted, typically from about 60 to about 180 degrees, to optimize evaporation while meeting environmental control standards.

The system maximizes dispersal of large volumes of water to generate the maximum available surface area of the water droplets. This is accomplished by atomizing the water to the smallest droplet size possible at the given pressure. For example, in a four array 12 system, applicants have achieved an average water droplet size of 300 microns per volume for normal production and fracture ponds. The droplet size tends to increase to about 500 microns per volume in high debris ponds.

The present system throws up to 980% more water per minute into the air than conventional water evaporation systems, thereby allowing the system to evaporate 10 to 30 times more water per day than previously achieved.

The present system also incorporates several features that minimizes impact on the environment. In addition to locating the nozzle arrays 12 near the center of the pond to separate the spray operation from the pond banks, atomizing the water to a finer mist than previously achieved, and managing the nozzle spray patterns to maximize evaporation, the present invention allows for optional windscreens (not shown) placed around the pond to further minimize overspray (spray that carries beyond the borders of the pond).

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

We claim as our invention:

1. A modular floating water evaporation system for use in evaporating wastewater from oil and gas drilling operations, located in a pond, the pond having a periphery, the system comprising:

a land based pump for pumping the wastewater from the pond into a filtration system via a discharge hose;

a filtration system located downstream of the pump for removing debris from the wastewater before feeding the wastewater into at least one receiving hose;

two or more pontoons connected to each other by cross braces;

a water reservoir to receive the water from the at least one receiving hose, the water reservoir being mounted on the cross braces between the two or more pontoons above the pond surface, the water reservoir having a top side;

two or more risers to receive the wastewater from the water reservoir, the risers extending above the surface of the pond and arranged equidistant along the top side of the water reservoir and detachably connected to and extending upward from the water reservoir; and at least one nozzle located on each riser for converting the wastewater into an evaporable spray.

2. The water evaporation system of claim 1 wherein each of the two or more risers comprises a Y-shaped arm structure comprising a vertical riser and at least two side risers extending outward from the vertical riser, each vertical and side riser having one of the nozzles attached to a distal end.

3. The water evaporation system of claim 1 wherein the cross braces have opposing ends and wherein an arcuately shaped mounting saddle is attached to each end of each cross brace, and wherein each pontoon is attached to a mounting saddle by attachment means.

4. The water evaporation system of claim 3 wherein the attachment means comprises retaining bands.

5. The water evaporation system of claim 1 wherein each nozzle is a hollow cone nozzle that provides a variable spray pattern that can be set from about a 60 degree cone to about a 180 degree cone.

6. The water evaporation system of claim 1 wherein the nozzles are capable of producing water droplets having an average diameter of about 300 microns.

7. The water evaporation system of claim 1 wherein the filtration system comprises a first manifold located down stream of the pump to separate the wastewater into two streams, two in-line filters, one for each stream, and a second manifold which receives the wastewater from both streams and directs the wastewater into the at least one receiving hose.

8. The water evaporation system of claim 1 wherein the two or more risers comprise spaced apart sets of three straight risers detachably mounted to the water reservoir, one of which is a central riser extending vertically upward from the water reservoir and the other two of which are side risers detachably connected to the extending upward from the water reservoir at an acute angle relative to the pond surface.

9. The water evaporation system of claim 8 wherein the acute angle is forty degrees.

* * * * *